United States Patent Office 2,772,283
Patented Nov. 27, 1956

2,772,283
PRODUCTION OF COPPER PHTHALOCYANINE PRECURSOR

Arthur C. Stevenson, North East, Md., assignor to E. I. du Pont de Nemours and Company, Wilmington, Del., a corporation of Delaware No Drawing. Application October 5, 1953,
Serial No. 384,349

5 Claims. (Cl. 260—314.5)

This application is a continuation-in-part of my copending application, Serial No. 286,631, filed May 7, 1952.

This invention relates to the production of copperphthalocyanine precursor, which may be defined as a alcohol-soluble complex compound having a composition corresponding to the empirical formula $Cu(C_8H_4N_2)_6NH$, and which is characterized by yielding copper phthalocyanine upon being treated with reducing agents, the remaining two units of phthalonitrile and the extra NH group being split off in the process in the form of ammonia and phthalonitrile or other phthalic compounds resulting from the interaction of phthalonitrile, ammonia and the reducing medium. This novel compound was first described in copending application of Barnhart and Skiles, Serial No. 252,401, wherein it was synthesized by reacting, at a temperature not exceeding 90° C., phthalonitrile, an anhydrous cupric salt and ammonia in an alcoholic solvent containing a catalyst, and recovering the reaction product by diluting the liquid portion of the reaction mass with water. The catalyst indicated in said copending application was a member of the group consisting of urea, biuret, guanidine and methyl glucamine.

In said copending application, the product was designated as leuco-copper phthalocyanine, by virtue of the fact that while the compound by itself has practically no tinctorial qualities, it is readily converted into the intensely colored copper phthalocyanine upon being heated above 100 C. or upon being treated with reducing agents. The term leuco-pthalocyanine, however, is of a broader nature, and includes compounds of the type described in the copending applications of C. J. Pedersen, Serial Nos. 252,187, -188 and -189, whereas the name phthalocyanine precursor has been adopted in the art to designate specifically compounds which have more than four phthalonitrile units per molecule, and which split off the excess phthalonitrile units upon being converted into pigment.

It is an object of this invention to improve the economy and efficiency of the process of producing copper-phthalocyanine precursor. A more particular object is to improve said process whereby the reaction may be achieved in a shorter time. Another particular object is to improve the process whereby to widen the range of solvents and metal salts usable for the reaction. Various other objects and achievements of this invention will appear as the description proceeds.

Now, the achievement of these objects according to this invention is based on the discovery that if the aforegoing reaction mass is contacted with oxygen in the gaseous state during the active period of the reaction, the latter will be complete, often with higher yields, in a much shorter period. By "oxygen in gaseous state" I mean air, mixtures of air and ammonia, and mixtures of oxygen and inert gases such as nitrogen or ammonia (care being, obviously, taken to avoid oxygen-ammonia mixtures in the explosive ratio).

Thus, whereas 20 or more hours were required for essentially complete reaction in the processes of Barnhart and Skiles, I find that my improved process gives the same, if not better results, by heating only for about 1 to 4 hours. Again, while the teachings of Barnhart and Skiles seem to be limited to the use of anhydrous cupric salts, I find that under the conditions of my invention the system will tolerate a limited quantity of water, say up to 6 or 8% of the organic liquid employed as solvent. Consequently, I may employ anhydrous or hydrated copper salts, for instance, any of the following: cupric chloride or its dihydrate; cupric bromide; cupric sulfate and its monohydrate or pentahydrate; cupric nitrate trihydrate; cupric acetate and its monohydrate.

As solvents for the reaction, the said Barnhart and Skiles application employs alcoholic solvents, principally the lower alkyl monoethers of ethylene glycol. In my improved process, the range of useable solvents is somewhat broader. Thus I may use the mentioned lower alkyl monoethers of ethylene glycol, or I may use the corresponding monoethers (e. g. methyl, ethyl, isopropyl or butyl monoethers) of diethylene glycol. I may also use neutral, liquid amides, such as dimethyl formamide and dimethyl acetamide. It will be noted that the preferred solvents are characterized by being water-miscible, which is an advantage, inasmuch as they can be readily washed out of any solid products recovered.

The mentioned solvents may be diluted with large quantities of ethyl, isopropyl or tertiary butyl alcohol, provided the total quantity of the principle solvent is sufficient to dissolve the reactants in the absence of the auxiliary alcohol.

As for the special assistants, referred to as catalysts in said Barnhart and Skiles application, I find that my improved process works best with guanidine, methylglucamine, iminophthalimidine, or 1, 3-diiminoisoindoline (Jour. Chem. Soc., 1952, pages 5000–02). Its quantity may vary from 0.05 to 0.5 mole per mole of phthalonitrile.

The explanation for the observed effect of oxygen is not clear to me. But I have observed that best results are obtained by passing the air through at a rate of 3 to 30 liters per hour per gram-mole of phthalonitrile, the volume being calculated at 25° C. and atmospheric pressure. In the case of a mixture of air and ammonia, or of any other form of diluted oxygen, an equivalent feeding rate, based on the oxygen content of the mixture, is applied. A higher rate of feed is not recommended. Furthermore, inasmuch as the reaction is exothermic, the rate of oxygen feeding will be moderated by the desire to keep the temperature of the reaction mass under control and not exceeding 98° C. Altogether then, the feeding-in of air or oxygen will normally be stretched out over a period of about 1 to 4 hours.

The temperature of the reaction, in my improved process, is preferably maintained within the limits of 55° to 98° C. A narrower range within this broad band will generally be preferred, the optimum for any particular copper salt being readily determined by trial. Thus, for anhydrous $CuCl_2$, the optimum reaction temperature is about 70–80° C.; for $CuSO_4.H_2O$, it is 80–92° C.

Apart from the above-mentioned variations, the reaction may otherwise follow the details set forth in the said application of Barnhart and Skiles.

Without limiting my invention, the following examples are given to illustrate my preferred mode of operation. Parts, where mentioned, are by weight. Also, where the weights are expressed in grams, the quantities obviously may be multiplied by any desired factor.

*Example 1*

22.5 grams of anhydrous cupric chloride were mixed with 300 grams of ethylene glycol monoethyl ether, and ammonia was passed into the mixture until it was saturated. 128 grams of phthalonitrile and 15 grams of methyl glucamine were added, and the mass was agitated at 70°–78° C. for one hour. During this time a stream of air representing a total oxygen content of 2.6 grams was passed uniformly into the mixture. (The average rate of feed was, therefore, about 9 liters of air per hour per gram-mole of phthalonitrile.) The insoluble residue which formed was filtered off and washed with 200 grams of ethylene glycol monoethyl ether. The combined filtrate and washings were then drowned in 10 liters of water, and the precipitated yellow-brown product was filtered off, washed with water and dried.

The yield was more than twice as great as by following the procedure of said copending application of Barnhart and Skiles. When 100 parts of this material were reduced with 100 parts of ascorbic acid in 10,000 parts of boiling ethylene glycol monoethyl ether, then filtered and dried, 65 parts of copper phthalocyanine were obtained.

The ethylene glycol monoethyl ether in the above example may be replaced by the methyl, isopropyl or butyl monoether of ethylene glycol, by the corresponding monoethers of diethylene glycol, or by a mixture of any such ether with ethanol, isopropanol or tert.-butanol.

Example 2

22.5 grams of anhydrous cupric chloride were mixed with 200 grams of dimethylformamide, and ammonia was passed into the mixture until it was saturated. 128 grams of phthalonitrile and 15 grams of methyl glucamine were added and the mass was agitated at 72°–78° C. for two hours. During this time a stream of air was passed into the mixture, the total amount of which corresponded to 2.6 grams of oxygen. (The average feed rate was, therefore, about 4.5 liters of air per hour per gram-mole of phthalonitrile.) An insoluble fraction which formed was removed by filtration, and the remaining material, together with 200 grams of dymethylformamide used to wash the insoluble portion, was drowned in 9 liters of water. A yellow-brown solid which separated was isolated by filtration, washed with water and dried. Reduction of this material with 125 grams of ascorbic acid in boiling ethylene glycol monoethyl ether, followed by filtration and drying, gave copper phthalocyanine in essentially theoretical yield.

The substitution of guanidine for methyl glucamine in the above examples produces similar results to those described. In lieu of cupric chloride, cupric bromide, sulfate or acetate may be used. The solvent in Example 2 may be replaced by dimethyl-acetamide, or by a mixture of either with a lower alcohol.

Example 3

128 grams of phthalonitrile, 20 grams of methyl glucamine and 30 grams of copper sulfate monohydrate (CuSo$_4$.H$_2$O) were stirred into 368 grams of dimethylformamide. Ammonia gas was passed into the mass with agitation and while maintaining the temperature at below 40° C., until the mass was saturated with ammonia and the copper ammonium complex was completely formed. The reaction mass was heated to 80° C. and a 50:50 mixture by volume of air and ammonia was bubbled through the mass for two hours at the rate of 17 liters per hour, while maintaining the temperature at 80–92° C. The reaction mass was then filtered, and the filtrate was poured into water. The precipitated phthalocyanine precursor was filtered off, washed with water until free of dymethylformamide and water-soluble salts, and dried. A good yield of high-quality precursor material was obtained.

In another experiment using an ammonia-air mixture of 1:2 by volume, and feeding it at a rate of 6 liters per hour for 2 hours, similar results were obtained.

Example 4

A mixture of phthalonitrile, methyl glucamine, copper sulfate monohydrate and dimethylformamide was prepared as in Example 3. Then, without pausing to add ammonia, the mixture was heated to 80° C., and a 50:50 air-ammonia mixture was bubbled through the mass for 2 to 3 hours, at the rate of 17 liters per hour, while regulating the temperature to the range of 80° to 92° C. A high yield of high-quality material was obtained.

Mixtures of ammonia and air having a larger ammonia content than 1:1 by volume may also be used.

Example 5

An agitated suspension of 190 grams of dymethylformamide, 22.5 grams of CuCl$_2$ and 5 cc. of water was saturated with anhydrous ammonia. Then 128 grams of phthalonitrile and 10 grams of methylglucamine were added and the mixture was heated to 78° C. Air was then bubbled through the reaction mass to the rate of 6 liters per hour for 1.5 hours while maintaining 78° C. The mass was then filtered, without cooling, and the filter cake was washed with 50 grams of dimethylformamide. The filtrate, including the wash, was drowned into 750 cc. of water, and the mass was filtered. The brown-colored filter cake thus obtained was washed with 400 cc. of water, reslurried in 750 cc. of water, filtered and washed with water until solvent-free and dried. The dried product constituted the desired precursor in excellent yield.

When the above example was repeated except using 10 cc. of water in lieu of 5 cc., the yield was somewhat lower. A third repetition, using 20 cc. of water, dropped the yield to an uneconomical value.

In lieu of methyl glucamine in the above examples, guanidine, iminophthalimidine or 1,3-diiminoisoindoline may be employed. In lieu of the solvents named in each of the examples, any other of the group of solvents indicated in the introductory discussion above, or mixtures of such solvents, may be employed. Mixtures of the mentioned solvents with lower alcohols may also be employed, without regard to degree of dilution, so long as the total quantity of the solvent from the group above mentioned is sufficient of itself to dissolve the reactants. In lieu of the copper salts specified in the examples, other copper salts of the group above indicated may be employed; it is advantageous, however, in such cases to change the temperature indicated in the particular example to the optimum range for the particular salt selected, as already discussed hereinabove.

Instead of bubbling the oxygenous gas thru the reaction mass, it may be passed over the surface of the liquid reaction mass provided the latter is suitably stirred and provided the rate of feeding is properly adjusted to compensate for the lesser surface of liquid-gas contact.

Numerous other variations in details will be readily apparent to those skilled in the art.

I claim as my invention:

1. A process of producing an alcohol-soluble complex compound adapted to yield copper phthalocyanine upon being treated with reducing agents and having a constitution corresponding to the formula Cu(C$_8$H$_4$N$_2$)$_6$NH, which comprises heating, at a temperature not exceeding 98° C., a reaction mass comprising phthalonitrile, ammonia, a cupric salt, a water-soluble organic solvent selected from the group consisting of dimethylformamide, dimethylacetamide, the lower alkyl monoethers of ethylene glycol and the lower alkyl monoethers of diethylene glycol, and an assistant selected from the group consisting of guanidine, methyl glucamine, imino-phthalimidine and 1,3-diiminoisoindoline, and contacting the reaction mass with oxygen in gaseous form substantially throughout the period of observable reaction.

2. A process as in claim 1, the oxygen being supplied in the form of a gas selected from the group consisting of air and mixtures of air with ammonia.

3. A process as in claim 2, the oxygen being passed through at a rate equivalent to from 3 to 30 liters of air per hour, per gram-mole of phthalonitrile.

4. A process for producing a complex compound adapted to yield copper phthalocyanine upon being treated with reducing agents, which comprises reacting, at a temperature between 80 and 92° C., phthalonitrile, cupric sulfate and ammonia in dimethyl formamide containing methyl glucamine, while passing through the reaction mass an oxygenous gas at a rate equivalent to from 3 to 30 liters of air per hour per gram-mole of phthalonitrile, and recovering the reaction product by diluting the liquid portion of the reaction mass with water.

5. A process for producing a complex compound adapted to yield copper phthalocyanine upon being treated with reducing agents, which comprises heating for a period of 2 to 3 hours and at a temperature between 80° and 92° C., a mixture of phthalonitrile, cupric sulfate, methyl glucamine and dimethyl formamide, while bubbling through the reaction mass a mixture of air and ammonia containing from 1 to 2 volumes of ammonia per volume of air at a rate of 6 to 17 liters of the mixture per hour per gram-mole of phthalonitrile, and reecovering the reaction product by diluting the liquid portion of the reaction mass with water.

References Cited in the file of this patent

UNITED STATES PATENTS

| | | |
|---|---|---|
| 2,302,612 | Lacey | Nov. 17, 1942 |
| 2,485,167 | Rintleman | Oct. 18, 1949 |
| 2,662,895 | Pederson | Dec. 15, 1953 |
| 2,662,896 | Pederson | Dec. 15, 1953 |
| 2,662,897 | Pederson | Dec. 15, 1953 |
| 2,681,347 | Pederson | June 15, 1954 |
| 2,681,348 | Brooks | June 15, 1954 |
| 2,727,043 | Rosch et al. | Dec. 13, 1955 |

FOREIGN PATENTS

| | | |
|---|---|---|
| 197,288 | Switzerland | Aug. 1, 1938 |
| 745,359 | Great Britain | Feb. 22, 1956 |

OTHER REFERENCES

Dent et al.: J. Chem. Soc. (London) vol. 1934, pp. 1033–1038.

Cook: J. Chem. Soc. (London) vol. 1938, pp. 1763–1778.

Linstead et al.: J. Chem. Soc. (London) vol. 1950, pp. 2981–2987, (1950).